(12) United States Patent
Nakamura et al.

(10) Patent No.: US 8,729,217 B2
(45) Date of Patent: May 20, 2014

(54) SEMI-CONDUCTIVE POLYIMIDE FILM

(75) Inventors: Masao Nakamura, Ibaraki (JP); Masahiro Kanbayashi, Ibaraki (JP); Yoshio Oota, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 170 days.

(21) Appl. No.: 11/727,499

(22) Filed: Mar. 27, 2007

(65) Prior Publication Data

US 2008/0242832 A1 Oct. 2, 2008

(51) Int. Cl.
*C08G 69/26* (2006.01)

(52) U.S. Cl.
USPC .......... 528/335; 399/308; 428/36.9; 428/141; 428/421; 428/473.5

(58) Field of Classification Search
USPC ............... 428/220, 16.9, 141, 421, 473.5; 528/335; 399/308
See application file for complete search history.

(56) References Cited

U.S. PATENT DOCUMENTS

| | | | |
|---|---|---|---|
| 4,886,874 A | 12/1989 | Nagano et al. | |
| 5,055,351 A * | 10/1991 | Fujimoto et al. | 428/336 |
| 5,081,229 A | 1/1992 | Akahori et al. | |
| 5,688,841 A | 11/1997 | Parish | |
| 5,939,498 A * | 8/1999 | Sutton et al. | 525/432 |
| 6,281,324 B1 * | 8/2001 | Nakamura et al. | 528/170 |
| 6,352,750 B1 * | 3/2002 | Kanetake | 428/36.9 |
| 2003/0119968 A1 * | 6/2003 | Hara et al. | 524/495 |
| 2004/0058147 A1 * | 3/2004 | Ozawa et al. | 428/325 |
| 2005/0145832 A1 | 7/2005 | Wessling et al. | |
| 2006/0263555 A1 * | 11/2006 | Iwamoto | 428/36.9 |

FOREIGN PATENT DOCUMENTS

| | | |
|---|---|---|
| JP | 4-148979 | 5/1992 |
| JP | 5-200904 A | 8/1993 |
| JP | 6-228335 A | 8/1994 |
| JP | 7-118526 A | 5/1995 |
| JP | 8-333454 A | 12/1996 |
| JP | 9-136975 | 5/1997 |
| JP | 10-63115 A | 3/1998 |
| JP | 2001-142313 A | 5/2001 |
| JP | 2002-341673 A | 11/2002 |
| JP | 2003-246927 A | 9/2003 |
| JP | 2004-284164 A | 10/2004 |
| JP | 2004-287005 A | 10/2004 |
| JP | 2006-323081 A | 11/2006 |

OTHER PUBLICATIONS

European Search Report dated Aug. 21, 2007.
Japanese Office Action issued Jul. 21, 2010 in the corresponding Japanese Patent Application No. 2005-281865.
Office Action issued Feb. 17, 2011, in counterpart Chinese Application No. 200710089720.X.
Chinese Office Action dated Sep. 15, 2011, issued in corresponding Chinese Patent Application No. 200710089720.X.
Japanese Office Action issued on Nov. 16, 2010 in corresponding Japanese Patent Application No. 2005-281865.
Communication dated Mar. 19, 2013 from the European Patent Office in European application No. 07 006 332.6.

* cited by examiner

*Primary Examiner* — Gregory Listvoyb
(74) *Attorney, Agent, or Firm* — Sughrue Mion, PLLC

(57) ABSTRACT

The present invention provides a semi-conductive polyimide film having: a common logarithm of a surface resistivity at 25° C. and 60% RH of 9 to 15 log Ω/square; a common logarithm of a volume resistivity of 8 to 15 log Ω·cm; a fatigue stress in accordance with a fatigue test complying with JIS K7118, upon a number of repetition being $10^7$, of 160 MPa or more; and a number of durable bending in accordance with an MIT test complying with JIS P8115 of 2,000 times or more, and an intermediate transfer belt and an transfer transportation belt using the semi-conductive polyimide film.

4 Claims, No Drawings

SEMI-CONDUCTIVE POLYIMIDE FILM

FIELD OF THE INVENTION

This invention relates to a semi-conductive polyimide film excellent in durability, and, particularly, the semi-conductive polyimide film is useful for an intermediate transfer belt and a transfer transportation belt in apparatuses for forming and recording images by electrophotography method.

BACKGROUND OF THE INVENTION

An intermediate transfer belt, a transfer transportation belt, and the like in apparatuses forming and recording images by the electrophotography method, such as a copying machine, a laser printer, a video printer, a facsimile, and a Multi Function Printer (MFP) thereof, are used under more severe conditions as compared to conventional conditions due to recent improvements in image quality, speed, and compactness. Particularly, a stress applied on a roll bending part is increased since a roll having a smaller roll is used for the intermediate transfer belt and the transfer transportation belt due to the downsizing of the apparatuses, and factors for causing elongation and rupture of the belts are increased since a tensile force applied to the belts is increased due to the high speed, thereby increasing a demand for a seamless belt superior in durability.

As semi-conductive belts to be used for the intermediate transfer belt, those formed from films made from a rubber material, a fluorine-based material (vinylidene fluoride), a polycarbonate resin material, a polyimide resin material, a plyamideimide resin material, and the like have heretofore been known (see References 1 to 3, for example).

However, such conventional belts have problems of deformation in long-term use, alteration of transferred image, rupture, and the like that are caused by the increase in load applied on the belt during driving due to the recent improvements in speed, compactness, and image quality.

[Reference 1] JP-A-5-200904
[Reference 2] JP-A-6-228335
[Reference 3] JP-A-10-63115

SUMMARY OF THE INVENTION

An object of this invention is to provide a semi-conductive polyimide film excellent in durability, and in the case that the semi-conductive polyimide film is used as an intermediate transfer belt or a transfer transportation belt in an electrophotography recording apparatus, the belt is hardly or never deformed or ruptured and free from a toner image alteration and transfer scattering when a load is applied thereon during long time driving along a small diameter roll in a state where a stress is applied on the belt, thereby achieving good image transfer on recording sheets for a long time.

The inventors of this invention have conducted extensive researches in order to attain the above object and found that a use of a semi-conductive polyimide film excellent in fatigue resistance and flexural resistance as an intermediate transfer belt considerably reduces occurrence of deformation and rupture of the belt in a long-term driving, thereby accomplishing this invention.

A semi-conductive polyimide film of the invention has: a common logarithm of a surface resistivity at 25° C. and 60% RH of 9 to 15 log Ω/square; a common logarithm of a volume resistivity of 8 to 15 log Ω·cm; a fatigue stress in accordance with a fatigue test complying with JIS K7118, upon a number of repetition being $10^7$, of 160 MPa or more; and a number of durable bending in accordance with an MIT test complying with JIS P8115 of 2,000 times or more. The surface resistivity, the volume resistivity, the fatigue stress, and the number of durable bending are measured by methods described in Examples.

The semi-conductive polyimide film having the above-described characteristics has good balance between rigidity and flexibility and is excellent in fatigue resistance and flexural resistance. Therefore, when the semi-conductive polyimide film is used as an intermediate transfer belt and a transfer transportation belt for a long time, it is possible to suppress cracking and rupture due to flexural stress and fatigue of the belts.

The semi-conductive polyimide film of the invention is preferably obtained from a polyamide acid solution comprising at least one of: a copolymer comprising a repeating unit of: a component A in which a fully aromatic skeleton which is a tetracarboxylic acid residue and a p-phenylene skeleton which is a diamine residue are bound by an imide bond; and a component B in which a fully aromatic skeleton which is a tetracarboxylic acid residue and a diphenylether skeleton which is a diamine residue are bound by a imide bond; and a blend of: a polymer comprising the component A as a repeating unit; and a polymer comprising the component B as a repeating unit, wherein a composition molar ratio of the component A and the component B (A/B) is 7/3 to 3/7.

The inventors found that it is possible to produce the polyimide film excellent in fatigue resistance and flexural resistance by using the polyamide acid solution comprising the copolymer or the blended matter containing the component forming the rigid skeleton (component A) and the component forming the flexible skeleton (component B) at the predetermined ratio. The polyimide film of the above composition has good endurance when used as the intermediate transfer belt and the like continuously for a long time.

An intermediate transfer belt and a transfer transportation belt of this invention comprise the above semi-conductive polyimide film. The semi-conductive polyimide film is excellent in fatigue resistance and flexural resistance. Therefore, in the case where the semi-conductive polyimide film is used as an intermediate transfer felt or a transfer transportation belt of an electrophotography recording apparatus, the belt is less subject to deformation and rupture and is capable of transferring good images on recording sheets over a long period of time without causing toner image alteration and transfer scattering.

According to this invention, it is possible to obtain a semi-conductor polyimide film excellent in fatigue resistance and flexural resistance. By using the film for an intermediate transfer system and a transfer transportation system in apparatuses for forming and recording images by the electrophotography method, such as a copying machine, a laser printer, a video printer, a facsimile, and a Multi Function Printer (MFP) thereof, it is possible to provide a high image quality, high speed, and compact system.

DETAILED DESCRIPTION OF THE INVENTION

Hereinafter, examples of this invention will be described in detail.

A common logarithm of a surface resistivity at 25° C. and 60% RH of the semi-conductive polyimide film of this invention is 9 to 15 (log Ω/square) and may preferably be 10 to 12 (log Ω/square). For example, for the use as an intermediate transfer belt, a white spot occurs when the surface resistivity is less than 9 (log Ω/square), and transfer scattering occurs when the surface resistivity is more than 15 (log Ω/square).

A common logarithm of a volume resistivity of the semi-conductive polyimide film is 8 to 15 (log Ω·cm) and may preferably be 9.5 to 12 (log Ω·cm). A white spot occurs when the volume resistivity is less than 8 (log Ω·cm), and a transfer scattering occurs when the volume resistivity is more than 15 (log Ω·cm).

A fatigue stress of the semi-conductive polyimide film of this invention detected by a fatigue test complying with JIS K7118 wherein the number of repetition is $10^7$ is 160 MPa or more and may preferably be 170 MPa or more. When the fatigue stress is less than 160 MPa, the belt meanders in a continuous long-term use to result in rupture and the like at the time of stress concentration. As used herein, the fatigue stress means an upper limit value of stress that the belt endured without rupture till $10^7$ times of repetition in the fatigue test.

A number of durable bending of the polyimide film of this invention detected by an MIT test complying with JIS P8115 is 2,000 times or more and may preferably be 5,000 times or more. When the number of durable bending is less than 2,000 times, the belt can be ruptured at the time of stress concentration during continuous use.

As a polyimide resin, it is preferable to use a polyamide acid solution comprising: a copolymer comprising a repeating unit of a component A in which a fully aromatic skeleton which is a tetracarboxylic acid residue and a p-phenylene skeleton which is a diamine residue are bound by an imide bond and a component B in which a fully aromatic skeleton which is a tetracarboxylic acid residue and a diphenylether skeleton which is a diamine residue are bound by a imide bond; and/or a blend of a polymer comprising the component A as a repeating unit and a polymer comprising the component B as a repeating unit.

A composition molar ratio of the component A and the component B (A/B) may preferably be 7/3 to 3/7, more preferably 6/4 to 4/6. When the component A having the rigid skeleton exceeds the above ratio, flexural resistance is reduced due to low flexibility, though elasticity is increased. When the component B having the flexible skeleton exceeds the above ratio, flexural resistance becomes lower than those of the copolymer and the blended matter, though flexibility and strechability are increased.

A tetracarboxylic acid dianhydride is preferably used for generating the fully aromatic skeleton, and examples thereof includes a pyromellitic acid dianhydride (PMDA), 3,3',4,4'-biphenyltetracarboxylic acid dianhydride (BPDA), 2,3,6,7-naphthalenetetracarboxylic acid dianhydride, 1,2,5,6-naphthalenetetracarboxylic acid dianhydride, 1,4,5,8-naphthalenetetracarboxylic acid dianhydride, and the like. Among the above, BPDA is particularly suitably used.

Also, p-phenylenediamine (PDA) is preferably used as a diamine component for generating the p-phenylene skeleton. For generating the diphenylether skeleton, 4,4'-diaminodiphenylether, 3,3'-diaminodiphenylether, or the like is preferably used as a diamine component, wherein 4,4'-diaminodiphenylether (DDE) is preferred.

For producing the semi-conductive polyimide film of this invention, the polyamide acid solution is prepared to start with.

The polyamide acid is prepared by employing a known method such as a method of dispersing a conductive agent, for example, into a solution; adding a catalyst to the solution; and dissolving and polymerizing a tetracarboxylic acid dianhydride and diamine at a predetermined blending ratio in the thus-obtained dispersion solvent, a method of obtaining a polyamide acid solution by dissolving and polymerizing a tetracarboxylic acid dianhydride and diamine at a predetermined blending ratio in a solvent and then adding a conductive agent into the solution, and the like.

The solvent to be used in this invention may preferably be a polar solvent from the view points of solubility and the like, and examples thereof include N,N-dialkylamides such as N,N-dimethylformamide, N,N-dimethylacetoamide, N,N-diethylformamide, and N,N-diethylacetoamide, N,N-dimethylmethoxyacetoamide, dimethylsulfoxide, hexamethylphosphortriamide, N-methyl-2-pyrrolidone (NMP), pyridine, dimethylsulfon, dimethyltetramethylenesulfone, and the like.

Examples of the conductive agent to be used in this invention include carbon black such as ketjen black and acetylene black, a metal such as aluminum and nickel, a conductive and semi-conductive powder of tin oxide and like metal oxide compounds, potassium titanate, and the like, a conductive polymer such as polyaniline and polyacetylene, and the like, and these may be used alone or in combination of two or more without limitation to the type. In this invention, from the view points of conductivity imparting effect, uniform dispersibility, and the like, it is preferable to use the carbon black alone or in combination with other conductive substance.

A content of the conductive agent may be selected depending on the type of the conductive agent and may preferably be about 5 to 30 wt %, more preferably 10 to 25 wt %, with respect to the resin. When the content is less than 5 wt %, uniformity in electric resistance is reduced to sometimes result in a remarkable reduction in surface resistivity during use. When the content exceeds 30 wt %, it is difficult to achieve the desired resistance, and a molded material to be obtained becomes undesirably fragile.

It is possible to employ known dispersion methods as the method for dispersing the conductive agent, and dispersion work may be performed by employing a ball mill, a sand mill, a planetary mixer, a triroll mill, supersonic wave dispersion, and the like. Also, in order to achieve a uniform dispersion, a dispersant such as a surfactant may be used. The dispersant is not particularly limited insofar as it meets the object of this invention, and examples thereof include a dispersion stabilizer such as a polymer dispersant, a surfactant, and an inorganic salt, wherein the surfactant is preferred.

Examples of the polymer dispersant include poly(N-vinyl-2-pyrrolidone), poly(N,N'-diethyl acrylazide), poly(N-vinylformamide), poly(N-vinylacetoamide), poly(N-vinylphthalamide), poly(N-vinylamide succinate), poly(N-vinylurea), poly(N-vinylpiperidone), poly(N-vinylcaprolactam), poly(N-vinyloxazoline), and the like, and it is possible to add one or more of the polymer dispersants.

Examples of the surfactant include carboxylic acid type, sulfate ester type, and sulfonic acid type negative ion surfactants, quaternary ammonium type, aliphatic amine type, and imidazolinium type positive ion surfactants, amineoxide type, glycine type, and betaine type zwitterionic surfactants, and ether type, ester type, aminoether type, etherester type, and alkanolamide type nonionic surfactants.

In order to enhance mechanical strength and durability of the semi-conductive polyimide film, a catalyst may preferably be added to the polyimide acid solution.

Examples of the catalyst include tertiary amine such as trimethylamine, triethylamine, triethylenediamine, tributylamine, dimethylaniline, pyridine, 9-picoline, 6-picoline, y-picoline, isoquinoline, and lutidine and an organic base such as 1,5-diazabicyclo[4.3.0]nonane-5,1,4-diazabicyclo[2.2.2]octane, and 1,8-diazabicyclo[5.4.0]undecen-7, wherein the tertiary amine is preferred in view of stability and easiness in controlling an imidization reaction, and isoquinoline is particularly preferred.

An amount of the catalyst to be added may preferably be 0.04 to 0.3 mol equivalent, more preferably 0.1 to 0.2 mol equivalent, with respect to 1 mol equivalent of the polyamide acid in the polyamide acid solution.

A monomer concentration (tetracarboxylic acid dianhydride and diamine (ex. PDA+DDE) in solvent) in the polyamide acid solution may preferably be 5% to 30% though it may be varied depending on various conditions. Also, a reaction temperature during the dissolution and polymerization may preferably be set to 80° C. or less, more preferably 5° C. to 50° C., and a reaction temperature may ordinarily be 5 to 10 hours.

It is possible to obtain the polyimide film of this invention by performing dry removal of the solvent of the polyamide acid solution by heating, removal of dehydration ring closing water, and completion of an imide conversion reaction. It is preferable to perform molding of the polyamide acid solution when the polyamide acid solution is in the form of the solution in view of easiness of molding.

As a seamless belt molding method, it is possible to employ an appropriate method in accordance with conventional methods, such as a method wherein a polyamide acid solution is coated on an inner periphery or an outer periphery of a cylindrical die by dipping, centrifugal molding, coating, cylindrical dice extrusion, or the like, a method wherein: a ring-shaped article is obtained by an appropriate method such as by filling a cast molding die with a polyamide acid solution; the ring-shaped article is formed into a belt-like shape by drying; the formed article is heated for achieving imide conversion of the polyamide acid; and releasing the molded article from the die, and the like (JP-A-61-95361, JP-A-64-22514, JP-A-3-180309, etc.). In the molding of the seamless belt, it is possible to perform appropriate treatments such as a mold release treatment and a defoaming treatment.

EXAMPLES

The present invention is now illustrated in greater detail with reference to Examples and Comparative Examples, but it should be understood that the present invention is not to be construed as being limited thereto. Evaluation items in Examples and the like were measured in accordance with methods described below.

Example 1

A carbon black-dispersed NMP solution was obtained by adding 39.4 g of carbon black (Special Black 4; product of Degussa) and a nonionic surfactant (alkyldiethanol amineoxide; 0.5 wt % with respect to the carbon black) to 944.7 g of N-methyl-2-pyrrolidone (NMP) followed by stirring for 12 hours by using a ball mill. After adding 4.3 g of isoquinoline to the carbon black-dispersed NMP solution (0.2 mol with respect to 1 mol of polyamide acid), 146.8 g of BPDA, 37.8 g of PDA, and 30.0 g of DDE were added (component A/component B=7/3), followed by polymerization under a nitrogen atmosphere. After thickening by the polymerization reaction, the mixture was stirred at 65° C. for 7 hours to obtain a carbon-dispersed polyamide acid solution (carbon black was adjusted to 24 wt % with respect to the polyimide resin component).

The thus-obtained polyamide acid solution was coated uniformly on an inner surface of a cylindrical die by using a circular dice followed by heating at 130° C. for 20 minutes, and then the temperature was raised to 360° C. in 30 minutes for removing the residual solvent, removing dehydration ring closing water, and imidization reaction followed by cooling to a room temperature. After that, the molded article was released from the die to obtain a seamless belt having a diameter of 100 mm, a thickness of 80 μm, and a length of 500 mm.

The thus-obtained belt was cut by a width of 250 mm and evaluated by a continuous durability test. After a continuous driving of 240 hours, neither crack nor breakage occurred in the belt to reveal that the belt was excellent in durability. A surface resistivity, a volume resistivity, a tensile strength, a tensile elasticity, a fatigue stress, and a number of durable bending of the belt were measured. The results are shown in Table 1.

Example 2

A carbon black-dispersed NMP solution was obtained by adding 39.4 g of carbon black (Special Black 4; product of Degussa) and a nonionic surfactant (alkyldiethanol amineoxide; 0.5 wt % with respect to the carbon black) to 944.7 g of N-methyl-2-pyrrolidone (NMP) followed by stirring for 12 hours by using a ball mill. After adding 4.5 g of isoquinoline to the carbon black-dispersed NMP solution (0.2 mol with respect to 1 mol of polyamide acid), 146.8 g of BPDA, 27.0 g of PDA, and 50.1 g of DDE were added (component A/component B=5/5), followed by polymerization under a nitrogen atmosphere. After thickening by the polymerization reaction, the mixture was stirred at 65° C. for 7 hours to obtain a 110 Pa·s carbon-dispersed polyamide acid solution (carbon black was adjusted to 23 wt % with respect to the polyimide resin component). A seamless belt was obtained in the same manner as in Example other than the above-described conditions.

The thus-obtained belt was cut by a width of 250 mm and evaluated by a continuous durability test. After a continuous driving of 240 hours, neither crack nor breakage occurred in the belt to reveal that the belt was excellent in durability. A surface resistivity, a volume resistivity, a tensile strength, a tensile elasticity, a fatigue stress, and a number of durable bending of the belt were measured. The results are shown in Table 1.

Example 3

A carbon black-dispersed NMP solution was obtained by adding 39.4 g of carbon black (Special Black 4; product of Degussa) and a nonionic surfactant (alkyldiethanol amineoxide; 0.5 wt % with respect to the carbon black) to 944.7 g of N-methyl-2-pyrrolidone (NMP) followed by stirring for 12 hours by using a ball mill. After adding 4.7 g of isoquinoline to the carbon black-dispersed NMP solution (0.2 mol with respect to 1 mol of polyamide acid), 146.8 g of BPDA, 16.2 g of PDA, and 70.1 g of DDE were added (component A/component B=3/7), followed by polymerization under a nitrogen atmosphere. After thickening by the polymerization reaction, the mixture was stirred at 65° C. for 7 hours to obtain a 110 Pa·s carbon-dispersed polyamide acid solution (carbon black was adjusted to 19 wt % with respect to the polyimide resin component). A seamless belt was obtained in the same manner as in Example other than the above-described conditions.

The thus-obtained belt was cut by a width of 250 mm and evaluated by a continuous durability test. After a continuous driving of 240 hours, neither crack nor breakage occurred in the belt to reveal that the belt was excellent in durability. A surface resistivity, a volume resistivity, a tensile strength, a tensile elasticity, a fatigue stress, and a number of durable bending of the belt were measured. The results are shown in Table 1.

Comparative Example 1

A carbon black-dispersed NMP solution was obtained by adding 39.4 g of carbon black (Special Black 4; product of Degussa) and a nonionic surfactant (alkyldiethanol amineoxide; 0.5 wt % with respect to the carbon black) to 944.7 g of N-methyl-2-pyrrolidone (NMP) followed by stirring for 12 hours by using a ball mill. After adding 4.0 g of isoquinoline to the carbon black-dispersed NMP solution (0.2 mol with respect to 1 mol of polyamide acid), 146.8 g of BPDA and 54.0 g of PDA were added (component A/component B=10/0), followed by polymerization under a nitrogen atmosphere. After thickening by the polymerization reaction, the mixture was stirred at 65° C. for 7 hours to obtain a carbon-dispersed polyamide acid solution (carbon black was adjusted to 23 wt % with respect to the polyimide resin component). A seamless belt was obtained in the same manner as in Example other than the above-described conditions.

The thus-obtained belt was cut by a width of 250 mm and evaluated by a continuous durability test. The belt ruptured when about 30 hours had passed. A surface resistivity, a volume resistivity, a tensile strength, a tensile elasticity, a fatigue stress, and a number of durable bending of the belt were measured. The results are shown in Table 1.

Comparative Example 2

A carbon black-dispersed NMP solution was obtained by adding 39.4 g of carbon black (Special Black 4; product of Degussa) and a nonionic surfactant (alkyldiethanol amineoxide; 0.5 wt % with respect to the carbon black) to 944.7 g of N-methyl-2-pyrrolidone (NMP) followed by stirring for 12 hours by using a ball mill. After adding 4.0 g of isoquinoline to the carbon black-dispersed NMP solution (0.2 mol with respect to 1 mol of polyamide acid), 146.8 g of BPDA and 100.1 g of DDE were added (component A/component B=0/10), followed by polymerization under a nitrogen atmosphere. After thickening by the polymerization reaction, the mixture was stirred at 65° C. for 7 hours to obtain a carbon-dispersed polyamide acid solution (carbon black was adjusted to 19 wt % with respect to the polyimide resin component). A seamless belt was obtained in the same manner as in Example other than the above-described conditions.

The thus-obtained belt was cut by a width of 250 mm and evaluated by a continuous durability test. The belt ruptured when about 70 hours had passed. A surface resistivity, a volume resistivity, a tensile strength, a tensile elasticity, a fatigue stress, and a number of durable bending of the belt were measured. The results are shown in Table 1.

Evaluation Methods

1. Measurements of Surface Resistivity and Volume Resistivity

By using HIRESTA UP HCP-HT450 (product of Mitsubishi Chemical Corporation, Probe: UR), a surface resistivity and a volume resistivity at 25° C. and 60% RH were measured under the conditions of an applied voltage of 100 V and a voltage application period of 10 seconds.

2. Fatigue Test

By using a sample in the form of dumbbel No. 3 (JIS K6771 (K6301)) obtained by punching in accordance with JIS K-7118 and by using a pneumatic strength test machine (product of Shimadzu Corporation; SERVO PULSER EHF-F01, 4880 type control device), a fatigue stress (upper limit value of stress endured without rupture till $10^7$ times) was measured under the conditions of a temperature of 22° C. to 25° C., a maximum load stress of 300 MPa, a minimum load stress of 30 MPa, a frequency of 15 Hz (sine waveform), and the number of repetition of $10^7$ times.

3. MIT test

By using a test piece having a width of 15 mm in accordance with JIS P-8115 and by using an MIT tester (product of Tester Sangyo Co., Ltd.), measurement was conduced under the conditions of a bending angle of 270 degrees (right and left), a bending speed of 175 time/min., and a load of 9.8 N. The number of times endured until the test piece ruptured after the start of the test was detected as the number of durable bending.

4. Measurements of Tensile Strength and Tensile Elasticity

Measurements were conducted by using a belt test piece in the form of dumbbel No. 3 obtained by punching in accordance with JIS K6771 (K6301).

5. Continuous Durability Test

The obtained semi-conductive polyimide belt was cut by a width of 250 mm and mounted on a rotation device having a roll diameter of 10 mm, a roll speed of 10 m/min., and a belt tension of 2 kg/250 mm. A continuous driving of 240 hours was performed to evaluate breakage of the belt.

TABLE 1

|  | Unit | Example 1 | Example 2 | Example 3 | Comparative Example 1 | Comparative Example 2 |
|---|---|---|---|---|---|---|
| Composition Molar Ratio (Component A/Component B) | — | 7/3 | 5/5 | 3/7 | 10/0 | 0/10 |
| Surface Resistivity | logΩ/square | 9.4 | 11.5 | 13.8 | 11.4 | 13.5 |
| Volume Resistivity | logΩ · cm | 8.3 | 10.7 | 14.9 | 10.5 | 14.7 |
| Fatigue Stress ($10^7$ times) | MPa | 170 | 190 | 160 | 130 | 140 |
| Number of durable bending | Times | 10,000 | 12,200 | 2,100 | 40 | 250 |
| Continuous Durability Test | — | No crack nor rupture | No crack nor rupture | No crack nor rupture | Ruptured | Ruptured |

As shown in Table 1, each of the belts of Examples 1 to 3 of which the composition molar ratio of the component A and the component B was in the predetermined range was free from crack and rupture after the 240 hours of continuous driving to reveal its excellent durability. In contrast, each of the belts of Comparative Examples 1 and 2 of which the composition molar ratio of the component A and the component B was out of the predetermined range ruptured after several tens of hours of continuous driving.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2005-281865 filed on Sep. 28, 2005, and the contents thereof are incorporated herein by reference.

What is claimed is:

1. A semi-conductive polyimide film having:
   a common logarithm of a surface resistivity at 25° C. and 60% RH of 9 to 15 log Ω/square;
   a common logarithm of a volume resistivity of 8 to 15 log Ω·cm;
   a fatigue stress in accordance with a fatigue test complying with JIS K7118, upon a number of repetition being $10^7$, of 160 MPa or more; and
   a number of durable bending in accordance with an MIT test complying with JIS P8115 of 2,000 times or more;
   wherein the semi-conductive polyimide film is obtained from a polyamide acid solution comprising at least one of
   a copolymer comprising a repeating unit of:
      a component A in which a fully aromatic skeleton which is a tetracarboxylic acid residue of 3, 3', 4, 4'-biphenyltetracarboxylic acid dianhydride (BPDA) and a p-phenylene skeleton which is a diamine residue are bound by an imide bond; and
      a component B in which a fully aromatic skeleton which is a tetracarboxylic acid residue of 3, 3', 4, 4'-biphenyltetracarboxylic acid dianhydride (BPDA) and a diphenylether skeleton which is a diamine residue are bound by an imide bond; and
   a blend of a polymer comprising the component A as a repeating unit and a polymer comprising the component B as a repeating unit,
   wherein a composition molar ratio of the component A and the component B (A/B) is 7/3 to 3/7; and
   the semi-conductive polyimide film comprises at least one conductive agent in an amount of 5 to 30 wt %.

2. An intermediate transfer belt comprising the semi-conductive polyimide film according to claim 1.

3. A transfer transportation belt comprising the semi-conductive polyimide film according to claim 1.

4. The semi-conductive polyimide film according to claim 1, wherein the conductive agent is selected from the group consisting of a carbon black, a metal, a metal oxide compound, a conductive powder, a semi-conductive powder and a conductive polymer.

* * * * *